(No Model.)

H. J. SCHILD.
VEHICLE SPRING.

No. 309,884. Patented Dec. 30, 1884.

WITNESSES
N. W. Mortimer
E. G. Siggers

Henry J. Schild
INVENTOR
by C. A. Snow & Co
Attorneys

UNITED STATES PATENT OFFICE.

HENRY JACOB SCHILD, OF STANTON, MICHIGAN.

VEHICLE-SPRING.

SPECIFICATION forming part of Letters Patent No. 309,884, dated December 30, 1884.

Application filed August 13, 1884. (No model.)

*To all whom it may concern:*

Be it known that I, HENRY J. SCHILD, a citizen of the United States, residing at Stanton, in the county of Montcalm and State of Michigan, have invented a new and useful Improvement in Vehicle-Springs, of which the following is a specification, reference being had to the accompanying drawings.

My invention relates to vehicle-springs; and it has for its object to provide side springs for buggies and the like that shall possess superior advantages in point of simplicity, inexpensiveness, durability, and general efficiency; and the invention consists in the construction and novel arrangement of parts, as will be hereinafter fully described, and particularly pointed out in the claim.

Figure 1:
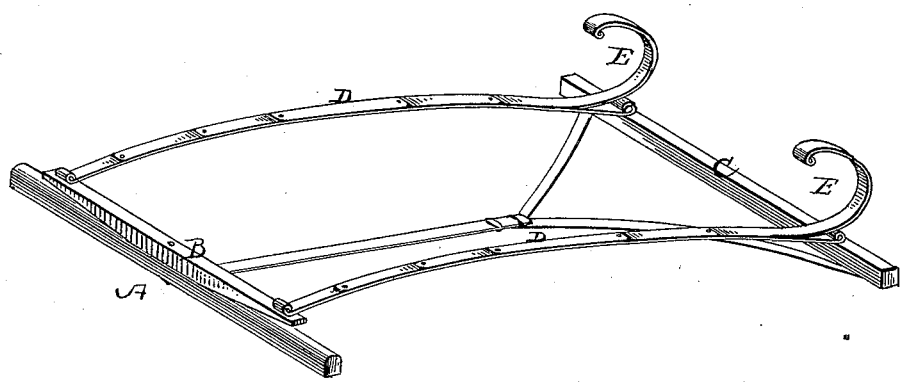
Figure 2:
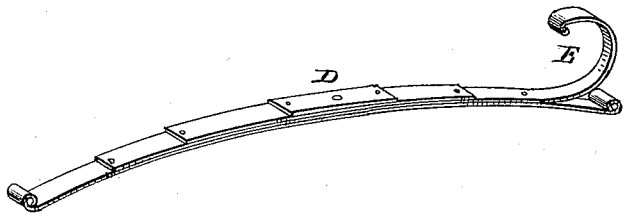

In the drawings, Figure 1 is a view in perspective of a portion of the running-gear of a vehicle provided with my improved side springs, and Fig. 2 is a perspective view of one of the springs detached.

Referring by letter to the accompanying drawings, A designates the front axle, B the head-block, and C the rear axle, of the running-gear of a vehicle. The head-block B and the rear axle, C, are connected by the side springs, D D, which terminate in C-springs E, which form the rear supports for the body of the vehicle. The head-block and rear axle are also connected by a Y-shaped reach, so that the strain upon the springs comes only from the vehicle-body.

The C-extensions may be formed of one or more of the spring-plates, and thereby form combined side and C springs, used for the support of bodies in which the greatest weight comes back of the middle of the side springs, and these combined side springs and C-springs prevent the body from tilting back, and presenting an appearance as if ascending a hill, which is so objectionable a feature in side-spring vehicles. By turning the C-springs over the rear axle, as shown, they relieve the side springs from the great strain caused by the greatest weight being placed back of the center of the support.

By having the spring-supports over the rear axle these springs are especially adapted to long bodies. The C-supports work in harmony with the side springs, and impart a finished appearance to the vehicle.

Having thus fully described my invention, what I claim as new, and desire to secure by Letters Patent of the United States, is—

The herein-described vehicle-spring, consisting of a lower leaf having eyes at each end, a second leaf having an upturned curve, E, at its rear end, provided with an eye, and two shorter leaves above the leaf with the curve E, substantially as specified.

In testimony that I claim the foregoing as my own I have hereto affixed my signature in presence of two witnesses.

HENRY JACOB SCHILD.

Witnesses:
JAMES CURRY,
MARTIN MALONE.